United States Patent Office 2,997,363
Patented Aug. 22, 1961

2,997,363
PRODUCTION OF COMPLEX-METAL TANNING AGENTS
Theodor Pfirrmann, Ludwigshafen (Rhine), Germany, assignor to Badische Anilin- & Soda-Fabrik Aktiengesellschaft, Ludwigshafen (Rhine), Germany
No Drawing. Filed Mar. 26, 1956, Ser. No. 573,598
Claims priority, application Germany Apr. 1, 1955
5 Claims. (Cl. 8—94.26)

This invention relates to the production of tanning agents by the use of salts of polyvalent metals the ions of which are capable of forming complexes, organic derivatives of ammonia, phenols or naphthols, aldehydes or compounds splitting off aldehydes with the additional use of methylol compounds capable of condensation or compounds containing methylene groups fomred therefrom.

One object of the invention is the production of tanning agents with a high content of hydroxyl groups.

A further object of the invention is the production of tanning agents having amphoteric properties.

A further object of the invention is the production of tanning agents which contain little neutral salts.

A further object of the invention is the production of tanning agents which can be used for retanning.

A further object is the production of tanning agents which improve the fastness to light and the dyeing properties of vegetable-tanned leather when used retanning agents therefore.

These objects are achieved according to this invention by causing a salt of a polyvalent metal capable of a complex formation and dispersable in water with an acid reaction, an organic ammonia derivative, an aldehyde or a compound splitting off an aldehyde, an aromatic hydroxy compound and a methylol compound capable of condensation or a derivative obtained from such a methylol compound and etherified on the methylol hydroxide, or a methylene compound formed by condensation of such a methylol compound to act on one another by mixing.

Among metals of which the salts are capable of forming complexes and which are suitable for the production of tanning agents according to the present invention there may be mentioned metals forming polyvalent ions, preferably metals of the second, third, fourth, sixth and eighth groups of the Periodic System of elements. Those metals are therefore especially suitable which are capable of forming divalent, trivalent, tetravalent or higher valency ions. Metals which are preferred from the point of view of economy are zinc, aluminum, titanium, zirconium, chromium and iron. As salts of these metals it is preferred ot use those which in aqueous solution have an acid reaction due to hydrolysis. Suitable acids for the formation of the salts are strong monobasic and polybasic mineral acids, as for example hydrochloric acid, sulfuric acid, and phosphoric acid. Metal salts of the said kind are the chlorides and sulfates of aluminum, titanium, zirconium, chromium and iron. Mixtures of the metal salts may also be used, either with each other or with zinc salts. "Complex" according to the rules of the co-ordination theory is meant to denote compounds of higher order.

The organic derivatives of ammonia may belong to the class of aliphatic, aromatic and heterocyclic compounds. The nitrogen atom may occur once or more than once in the derivative. Alkylamines, arylamines and carboxylic acid amides may be used. Accordingly one hydrogen atom in the ammonia may be replaced by an alkyl, aryl or acyl radical. Also two or three hydrogen atoms of the ammonia can be replaced by the said radicals or different radicals of the said kind. Quaternary ammonium bases may also be used. There may be mentioned in particular monoamines and, among these, first monoalkylamines, such as ethylamine, propylamine, butylamine, diamines, such as alkylene diamines, as for example ethylene diamine, propylene diamine, butylene diamine, polyamines, such as polyalkylene polyamines, as for example diethylene triamine and dipropylene triamine. Amines capable of being used are for example diethylamine, dipropylamine, trialkylamines and alkylolamines. The amines may contain still further functional groups such as is the case in amino alcohols, amino carboxylic acids and aminosulfonic acids. To these belong ethanolamine, propanolamine, diethanolamine, glycine, alanine, protein hydrolyzates, taurine and sarcosine. As quaternary ammonium bases there may be mentioned for example triethanolamine, dimethylaniline or oleyl-methylaniline quaternized with dimethyl sulfate or alkylhalides, or the corresponding bases.

Aromatic amines which are suitable for the purposes of the present invention are for example monoamines and polyamines which are derived from benzene or from naphthalene, such as aniline, diphenylamine, phenylene diamine, aminophenols, naphthylamines, anthranilic acid and sulfanilic acid. The amino groups may also bear alkyl radicals, such as in methylaniline or ethylaniline. The hydrogenated aromatic amines which are also termed cycloalkylamines or cycloaliphatic amines are also capable of being used, as for example cyclohexylamine, dicyclohexylamine and hydrogenated naphthylamine. The amino groups can also be separated from the aromatic radical by an alkyl radical, as for example in benzylamine.

The ammonia derivative may also be so constructed that the nitrogen atom is a member of a heterocyclic ring. The hetero ring may bear one nitrogen atom or it may bear two or more nitrogen atoms as in melamine, pyrrolidine, piperidine and hexamethylene imine.

Acyl derivatives of ammonia are acid amides. Aliphatic and aromatic acid amides are suitable, as for example acid amides of low molecular weight and high molecular weight fatty acids, such as acetamide, propionic acid amide, lauric acid amide, oleic acid amide, stearic acid amide, benzamide and alkylbenzamides. The low molecular weight and first members of the series are especailly suitable, such as formamide, urea, dicyandiamide, urethanes, as for example ethyl urethane, butyl urethane and the diurethanes derived from ethylene glycol or butanediol. Thus not only compounds with one amide nitrogen, but also those with two amide nitrogen atoms or two carboxylic acid amide groups in the molecule are suitable. Amides of dicarboxylic acids, as for example adipic acid amide, are also suitable. Mixtures of all these compounds may also be used. At this point dicyandiamide may be mentioned as being especially suitable.

Suitable phenols are not only phenol itself but also phenols with two or more hydroxyl groups, such as pyrocatechol, resorcinol, hydroquinone and pyrogallol. Frequently the pure products are not used, but technical grade mixtures, such as cresol or empyreumatic oil. The phenols may also contain further substituents, such as the dihydroxydiphenyl sulfones, phenolcarboxylic acids, as for example salicylic acid or gallic acid or phenolsulfonic acids. In addition to phenols which are derived from benzene, there may also be used aromatic hydroxy compounds derived from naphthalene, as for example alpha-naphthol, beta-naphthol and the dihydroxy naphthalenes. Mixtures of all the said hydroxy compounds may also be used.

Among the aldehydes aliphatic aldehydes or their derivatives are primarily employed. By derivatives we also mean compounds which split off aldehydes under the conditions of preparation of the tanning agents according to this invention. The following, for example, are suitable: formaldehyde, paraformaldehyde, acetaldehyde, acrolein, glyoxal, polyglyoxal, hexamethylene tetramine, formaldehyde sodium sulphoxylate. Long-chained aldehydes are also suitable, as are aromatic aldehydes, such as benzaldehyde.

Methylol derivatives capable of being condensed are obtained for example by reaction of acid amides, such as urea, dicyandiamide, heterocyclic amines, such as hexamethylene imine and melamine, of urethanes, such as butane-diol-diurethane, with formaldehyde or glyoxal. The aldehyde reacts with the hydrogen attached to the nitrogen atom with the formation of the methylol group. When there are two hydrogen atoms attached to the nitrogen atom, both hydrogen atoms may also be replaced by methylol groups. When the molecule contains two or more nitrogen atoms, such as in the case of urea or melamine, any number of the hydrogen atoms attached to nitrogen atoms may be replaced by methylol groups. In particular there may be mentioned mono- or polymethylol compounds, as for example methylolurea, dimethylolurea, dimethylolethylene glycol diurethane, dimethylolbutane-diol diurethane, mono-, di- or tri-methylolmelamine, and methylol compounds of dicyandiamide. Mixtures of the said methylol compounds may also be used, and also compounds containing methylene bridges formed by condensation of the methylol compounds. Such compounds are for example methylene urea, the condensation products of methylolureas or methylolmelamines with aromatic compounds, such as phenol, benzene sulfonic acids, naphthols, naphthalene sulfonic acids. The aromatic compounds, which are condensed with methylol urea, methylol melamine or other compounds containing methylol groups on nitrogen for the production of the compounds containing methylene bridges, may in turn already contain methylol groups formed by reaction with formaldehyde. The ethers of alcohols, cycloalcohols and phenols with the methylol compounds are also suitable.

There are various possibilities for the formation of the tanning agents from the aforesaid components. For example the metal salts, which are usually acid reacting, are dissolved in water or the metals, their basic salts or their salts with weak acids are dispersed in aqueous mineral acids or the salts containing water of crystallization, as for example $Al_2(SO_4)_3, 18H_2O$, are used in powder form. The concentration of the metal salt solution may be for example 5 to 60%. Into the solution there is introduced the ammonia derivative or a mixture of ammonia derivatives. The ammonia derivatives can be introduced in aqueous dispersion or as free bases without solvent. When salts containing water of crystallization are used, they may be ground with the ammonia derivative without further addition of water. By bringing together the metal salts with the amines, salt mixtures are formed. About 0.2 to 1.2 equivalents of ammonia derivative are used to 1 equivalent of metal salt. It is preferable to use so much ammonia derivative that the solution of the salt mixture has a pH of 3 to 4. The solution can be used as such for further processing or it can be dried. The aldehyde or a compound splitting off the aldehyde is then added, either as such or in solution or dispersion. If the resultant mixture is present as an aqueous dispersion, it is heated. If the operation at this stage is in the absence of water, the salt mixture can be ground with the aldehyde or the compound splitting off aldehyde. By heating the solution or grinding, a reaction takes place. The intermediate product thus obtained, if desired dried by vacuum evaporation, which has been prepared by the use of metal salt, ammonia derivative and aldehyde or compound splitting off aldehyde is then ground together with the organic compound containing hydroxyl groups in the aromatic nucleus or with a mixture of these compounds, as for example with phenols, cresols, phenol sulfonic acids, naphthols, naphthol sulfonic acids. During this grinding, or after the same, the compounds containing methylol groups are added and are similarly ground with the mixture.

The dispersion of the intermediate product which has been obtained by the use of metal salt, ammonia derivative and aldehyde or compound splitting off aldehyde, need not, however, be freed from water. The aromatic compound containing hydroxyl groups in the aromatic nucleus can also be added to the dispersion, heated for some time, for example 1 to 3 hours, at about 60° to 80° C. and the water only then evaporated off. The dried mass is then ground with the methylol compound.

The amount of aldehyde or compound splitting off aldehyde used amounts to about 0.2 to 1.2 equivalents to 1 equivalent of the ammonia derivative. The amount of the aromatic hydroxy compound amounts to about 0.2 to 2 equivalents to 1 equivalent of ammonia derivative. The amount of the methylol or methylene compound amounts to about 1 to 20 equivalents to 1 equivalent of ammonia derivative.

A further modification of the process of preparation consists in carrying out all the stages of the process in aqueous dispersion. Metal salt, ammonia derivative, aromatic hydroxy compound and aldehyde are united in aqueous medium, heated for 1 or more hours, the methylol compound then added and the whole heated again. After appropriate dilution, the final product can be directly used as a tanning agent.

The expression "dispersion" as used in this specification also includes solutions or suspensions as well as systems which consist to an appreciable extent of true solutions and suspensions. The word "suspension" is intended to embrace systems in which the substance suspended is solid or soft.

In the production of tanning agents according to this invention, it is not essential to follow the sequence outlined above. Further possibilities are, for example, as follows:

(a) The metal salt is combined in aqueous dispersion with the ammonia derivative and the aromatic hydroxy compound, heated until the free water has evaporated, and the remaining components are then added.

(b) The ammonia derivative is combined in aqueous dispersion with the aldehyde and the metal salt, dried and the dry product ground with the remaining components:

(c) The methylol or methylene compound is combined with the metal salt, the ammonia derivative is added, dried and ground with the aromatic hydroxy compound and the aldehyde;

(d) The methylol or methylene compound is combined with the aromatic hydroxy compound, the metal salt and ammonia derivatives are added and ground with the aldehyde.

The term "combined" in this connection means that the components are mixed dry and ground or allowed to act on each other in aqueous dispersions, if convenient while heating. The grinding is not an essential step, but promotes in a favorable way the action of the components on each other and leads to a product which is uniform. When neutralization or condensation occurs, there is in general a marked evolution of heat.

Further modifications of the process of manufacture may be seen in the examples. All these methods of procedure are to be considered as lying within the scope of the present invention. They may be summarized in the statement that the components are allowed to act on each other by mixing. This is possible in the absence of water by grinding the substances with one another. This method, however, occupies a relatively long time. It is better to grind in the presence of water, for example 10 to 100% by weight with reference to the total amount of tanning agent. If the components are to act on each other in aqueous dispersion, it is preferable to use an amount of water of about 100 to 2000%, advantageously 200 to 1000%, by weight with reference to the total amount of tanning agent and to heat the dispersion or allow the heating thereof to take place by exothermic reaction of the components with one another. Temperatures of between 30° C. and the boiling point of water may be maintained in the dispersion. In general it is preferred to use a temperature interval of 50° to 85° C. The course of the reaction can be rendered more smooth and can be accelerated by stirring the dispersion. Obviously two or three components can be allowed to act on each other in dispersion and the completion of the tanning agent with the remaining components effected by grinding. The opposite sequence is also possible.

The amounts in which the individual components or mixtures of various components of the same class are preferably used are summarized in the following table:

Metal salt:
  0.8 to 1.2 equivalents.
Ammonia derivative:
  0.2 to 1.2 equivalents with reference to the metal salt.
Aromatic hydroxy compound:
  0.2 to 2 equivalents with reference to the ammonia derivative.
Aldehyde or agent splitting off aldehyde:
  0.2 to 1.2 equivalents with reference to the ammonia derivative.
Methylol compound or methylene compound:
  1 to 20 equivalents with reference to the ammonia derivative.

In the finished tanning agent, the amount of metal salt together with the ammonia derivative can amount to 5 to 70% by weight with reference to the total tanning agent. If tanning agents are desired with which leather of mainly cationic (chrome) character can be prepared, it is preferable to increase the content of metal salt and ammonia derivative or of metal salt. Thus for example a leather can be obtained which is very similar to chrome leather but which has the great advantage as compared with chrome leather that it always retains its properties unchanged, i.e. that it can always be drummed, dyed and curried again from the dry state without the quality of the leather in practical use and the ease of handling it being impaired. If a leather with a more anionic character is desired, the content of aromatic hydroxy compound in the tanning agent is increased. Paler leather is obtained by using less aromatic hydroxy comopnuds and more metal salt. By increasing the proportion of ammonia derivative, the dye-ability of the leather is increased. Leather which is very rigid is obtained by increasing the proportion of methylol compounds. The incorporation of fatty materials with the tanning agents gives softer leather. By the use of compounds containing mainly methylene bridges, a tanning agent is obtained which slowly penetrates into the hide and therefore first remains in the surface. Compounds with an increased content of methylol groups, as for example the condensation product of dicyandiamide with a large amount of formaldehyde, yield more readily soluble tanning agents which therefore penetrate the hide more rapidly.

The tanning agents according to this invention are used in the usual concentration, in general in amounts of 5 to 25% by weight with reference to the moist unhaired hides. It is possible however to work in very concentrated tanning liquors. The tanning agents are suitable for all kinds of hides and for fur skins. The tanning agents may also be used with special advantage for retanning leather prepared with other tanning agents. Depending on the methylol compound used, leather may be obtained in which the retanning agent is mainly deposited in the outer layer or in which it has uniformly penetrated the whole leather. In this way the preliminary tanning agent is fixed still better and an especially full handle and solid grain can be produced. The retanning can be carried out subsequent to any of the customary tanning steps. The usual kinds of tanning are vegetable, synthetic, mineral, and oil tanning. For retanning there are used 1.5 to 10% by weight of the tanning agents prepared according to this invention, with reference to the moist unhaired hides.

Further advantages of the tanning agents prepared in accordance with the present invention will now be described in the following explanation of various tanning methods. The following examples will further illustrate this invention but the invention is not restricted to these examples. The parts specified are parts by weight.

EXAMPLE 1

80 parts of cyclohexylamine or hydrogenated naphthylamine and 18 parts of diethanolamine and then 120 parts of 40% formaldehyde are slowly introduced into an aqueous solution of 136 parts of aluminum chloride prepared by dissolving aluminum hydroxide in commercial hydrochloric acid. The whole is heated for about 1 hour at 60° to 80° C., the water removed by evaporation and the dry reaction mass ground with 75 parts of hydroquinone or resorcinol and 675 parts of dimethylolurea. The dimethylolurea is prepared in known manner by condensing 1 mol of urea and 2.2 mols of formaldehyde in the presence of ethanolamine sulfite and adjustment of the dried product to a pH-value of 6.5 to 7.0. The tanning agent obtained is a yellowish, somewhat hygroscopic powder which gives rather white, full leather. Zirconium chloride may also be used instead of the aluminum salt.

For use, the tanning agent is suspended in a 5 to 10% solution or dispersion of a fat liquor to which if desired 1 to 3% of formaldehyde may be added, and fulled in at a pH value of 5.5 to 6.5.

EXAMPLE 2

100 parts of chromium sulfate or 85 parts of chromium trichloride are dissolved in 100 parts of water and then 30 parts of ethylaniline or 20 parts of phenylene diamine and 60 parts of urea or dicyandiamide are added. The reaction mixture is cooled and then 220 parts of 40% formaldehyde are added and the whole further condensed at 50° to 60° C. Towards the end 50 to 150 parts of empyreumatic oil or 120 parts of dihydroxy diphenyl sulfone are added. By heating for two to three hours at 60° to 80° C., the condensation is carried to completion at a pH of 6 to 6.5. The reaction product is dried and ground fine together with 1050 parts of dimethylolurea or trimethylolmelamine.

The tanning agent thus obtained is used after dispersion in a dilute fat liquor emulsion which acts as an emulsifier for the tanning agent and as a fat-liquoring agent. The resultant very full and grain-fast leather is of yellow-brown color.

If in the production of the tanning agent the amounts of inorganic salts and basic compounds are increased while keeping the amount of the remaining substances including the liquor constant, a more supple leather is obtained. If the amount of methylol compounds is increased, the amount of fat must also be increased. The fat-liquoring agent and the emulsifier may also be added to the dry tanning agent. The approximate requirement of fat-liquoring agent is 5 to 30% with reference to the weight of tanning agent.

EXAMPLE 3

(a) 15 parts of cyclohexylamine and 5 parts of hexamethylene imine are added to 66 parts of aluminum sulfate containing water of crystallization while cooling. A friable mass is formed which is dried and ground with 18 parts of resorcinol and 12 parts of paraformaldehyde.

(b) 250 parts of a dry reaction product of 1 mol of urea or melamine with 2 to 3.5 mols of formaldehyde, which has been condensed with hydrochloric acid at pH 5 and adjusted with sodium carbonate to the pH 6.5 after drying, are ground with 30 parts of the alkali salt of a naphthalene sulfonic acid which has been condensed with formaldehyde or cresolformaldehyde. The whole is ground with the condensation product described under (a). The relative proportions of the products described under (a) and (b) can be varied within wide limits.

The tanning agent obtained is rich in methylene compounds and therefore almost insoluble in water but may readily be suspended therein. It is used together with a fatty oil which has been emulsified or rendered soluble by sulfonation, and to which a little formaldehyde may also be added. White leather is obtained which can no longer be detanned by washing. If this tanning agent is used for the retanning of chrome leather or vegetable-tanned leather, it is deposited mainly in the outer layers.

EXAMPLE 4

6 parts of urea, 5 parts of butylene diamine and 10 parts of benzylamine or diethanolamine are slowly added to a concentrated aqueous solution of about 34 parts of aluminum chloride. To the cloudy solution there are added 15 parts of pyrogallol or resorcinol and, after the addition of 20 parts of 40% formaldehyde, heated for about 30 minutes at 90° C. and then, after the addition of 25 parts of 30% glyoxal, heated again for about 60 to 120 minutes. The solution is adjusted to pH 6.5 to 6.8 with sodium carbonate and 100 to 500 parts of an about 50 to 60% solution of the dimethylol compound of butane-diol- or ethylene-glycol-diurethane added. The tanning agent dispersion, which is of good stability, is used together with anionic or cationic fat emulsions, preferably with liquors, and tanned fully at a pH value of 5 to 6, by adding some formic acid after the fat-liquoring is completed. The tanning agent, used as a retanning agent, readily penetrates into the interior of the leather and effects a uniform plumping of the leather.

EXAMPLE 5

50 parts of hydrogenated naphthylamine are added to 80 parts of titanyl sulfate ($TiOSO_4$) in 10 to 60% aqueous dispersion. A pasty mass is formed, which is dried. With the dry product there are mixed 60 parts of dihydroxy diphenyl sulfone, 15 parts of resorcinol, 30 parts of technical grade polyglyoxal and 500 to 600 parts of methylol compound of dicyandiamide which is difficultly soluble in water. The latter is prepared by reacting 1 mol of dicyandiamide with 2 to 3 mols of aqueous formaldehyde at 80° to 90° C. The mixture obtained is dried and 0.15 mol of alkylphenol sulfonate added. The whole mixture is then ground with the addition of such an amount of waterglass (trisodium silicate) that a 10% dispersion in distilled water has the pH value 5.5. A stable yellow-white tanning agent powder is obtained which can be used for tanning in aqueous suspension.

EXAMPLE 6

(a) An acid zirconium mixed salt is prepared by decomposing zirconium silicate ($ZrSiO_4$) in soda and dissolving the melt in technical grade hydrochloric acid. To 250 parts of the about 25 to 30% dispersion there are added 45 parts of xylidine and 25 parts of glycol diurethane. The resultant paste is dried.

(b) A methylol mixed compound is condensed at 70° to 90° C. from 1 mol of melamine, 0.15 mol of cresol and 3 mols of formaldehyde (as 30% aqueous solution). The condensate is precipitated by the addition of 0.1 mol of zinc sulfate and 0.2 mol of a condensation product of napthalene sulfonic acid and formaldehyde and dried.

400 parts of the dry product prepared under (b) are ground with 120 parts of the zirconium amine salt prepared under (a) and with 30 parts of resorcinol and 30 parts of commercial chloral hydrate, such an amount of trisodium phosphate being added that a pH value of about 5 results. A yellowish-brown stable tanning agent powder is obtained which is only partly soluble in water and is used for tanning in suspension.

EXAMPLE 7

A solution of 50 parts of chromium sulfate, 25 parts of aluminum sulfate (or zinc sulfate) and 25 parts of naphthalene sulfonic acid is introduced into 1000 parts of an about 55% aqueous solution of a methylol mixed condensate prepared from 1 mol of urea, 0.1 mol of ammonia (or ethanolamine), 0.15 mol of phenol and 2.2 mols of formaldehyde. The resultant precipitation product is mixed with 60 parts of dimethylaniline and dried. The dry product is ground with 40 parts of pyrocatechol and 50 parts of a condensation product of naphthalene sulfonic acid and formaldehyde and with 30 parts of solid polyglyoxal. Such an amount of waterglass is added that the pH value of the pulverulent tanning agent 4.5. The amphoteric tanning agent thus obtained is very stable. It has a good plumping action in retanning chrome and vegetable-tanned leather. Employed as a sole tanning agent, it gives a solid white leather.

A tanning agent with similar good properties is obtained by using, in the method of production described above, 1 mol of dicyandiamide and also 0.15 mol of melamine instead of 1 mol of urea, and 0.15 mol of salicylic acid instead of phenol.

EXAMPLE 8

65 parts of beta-naphthol and 15 parts of resorcinol are dissolved by heating above 100° C. in 650 parts of an about 85% aqueous solution of the dimethylol compound of butane-diol-diurethane. Partial ether formation takes place during the heating process. The mass is cooled to 70° to 80° C. 333 parts of aluminum sulfate ($Al_2(SO_4)_3.18H_2O$) are then added. The whole is reacted with 50 parts of p,p'-diamino-diphenylmethane and 30 parts of a quaternary ammonium compound prepared from triethanolamine and, for example, dimethyl sulfate or halogen alkyl. The mass obtained rapidly becomes solid. It is dried, mixed with 100 parts of a condensation product of naphthalene sulfonic acids and formaldehyde, with 50 parts of polyglyoxal and finally with such an amount of commercial soda that a pH-value of 5.5 is set up. A plastic yellowish-brown mass is obtained which may be suspended well in water for use as a tanning agent.

The necessary fat constituent can be incorporated in the tanning agent for example by mixing 40 to 30 parts of a sulfonated train or sperm oil with 60 to 70 parts of the tanning agent.

Instead of the dimethylol compound of butane-diol diurethane, there may also be used the same amount of the dimethylol compound of ethane-, propane- or hexane-diol diurethane. Furthermore instead of the urethane compound there may also be used the same amount of an etherified urea, melamine or dicyandiamide methylol compound, as for example 650 parts of a methyl ether.

By the use of the tanning agents obtained according to this example or its modifications, for tanning or retanning, softer and somewhat more flexible leather is obtained.

EXAMPLE 9

A 35 to 45% solution of methylol dicyandiamide, capable of being diluted well with water, is prepared in known manner from 1 mol of dicyandiamide and 5 mols of aqueous formaldehyde. Into 1150 parts of this solution there are introduced 100 parts of chromium sulfate and 80 parts of zinc sulfate. After these have been mixed, 35 parts of dimethyl-aniline and if desired 60 parts of ethylene diamine or 110 parts of hexamethylene diamine are mixed therewith, a reaction taking place. The reaction product is dried. With this product there are mixed 60 parts of resorcinol, 30 parts of paraformaldehyde and 100 parts of a condensation product of naphthalene sulfonic acid and formaldehyde. The product obtained is adjusted to pH 5 with waterglass. In this way a tanning agent is obtained which is pulverulent, which is for the most part soluble in water and which has a great affinity for the leather fibres.

EXAMPLE 10

(a) 100 parts of aluminum sulfate $(Al_2(SO_4)_3.18H_2O)$ in comminuted form are mixed with 25 parts of cyclohexylamine and 15 parts of aminophenol. After the reaction is completed, the product is dried and ground.

(b) By cautiously bringing together 180 parts of urea and 350 parts of 30% formaldehyde solution, if necessary while cooling, a condensed methylolurea is prepared. 100 parts of a solution of 15 parts of chromic hydroxide, 15 parts of naphthalene sulfonic acid and 100 parts of concentrated hydrochloric acid are added to the solution. While strongly heating up, the methylene urea separates in finely divided form. When it has all separated, it is filtered off and dried.

The two dry products (a) and (b) are finely ground together with 35 parts of resorcinol, 25 parts of a condensation product of naphthalene sulfonic acid and formaldehyde and 30 parts of polyglyoxal. The pH is then adjusted to 4.5 by the addition of waterglass. 1.5% of sperm oil or train oil are sprayed over the ground material to prevent dusting.

A stable non-dusting tanning agent powder is obtained which is safe to handle. It is well suited for retanning chrome and vegetable-tanned leather.

The tanning agents prepared in the manner described in the general description and in the examples are mainly water-insoluble, but can be dispersed well in water. They are amphoteric, but the cationic action predominates. The properties of the leather tanned therewith therefore lie between the properties of the anionic and the cationic tanned leather. The leather may therefore be made soft equally as well with cationic fat-liquoring agents as with anionic. The fat is anchored especially firmly in the leather by the tanning agents. The dyeing of the leather may also be carried out with anionic and cationic dyestuffs. The tanning agents are rich in hydroxyl groups and contain almost no neutral salt. By retanning chrome leather, the desired individuality of the chrome leather is scarcely changed by the tanning agents. Upon retanning vegetable-tanned leather, the tanning agents fix the anionic natural and synthetic tanning agents and improve the fastness to light and especially the dyeing properties of the vegetable-tanned leather. The shrinkage temperature of the leather produced with the tanning agents prepared according to this invention is raised to 85° to 90° C. With all fullness and fastness of grain, the leather acquires a supple handle. The tanning agents prepared according to this invention are so firmly anchored in the leather that they can no longer be removed from the leather without destruction of the hide structure. This advantage as compared with the known tanning agents is noteworthy, for the latter are in part undesirably removed again upon further working up or use of the leather. The leather produced with the tanning agents according to this invention may be finished well with pigment finishes.

I give below a few examples to illustrate tanning with the tanning agents prepared according to this invention.

Tanning of unhaired hides

For the tanning of unhaired hides it is preferable to use the tanning agents having better solubility in water. They are dispersed, if necessary in warm water, and allowed to act in the usual way, for example on the hides pickled with common salt, in amounts of 5 to 25% by weight of the pared weight. It may be preferable to use elevated tanning temperatures, for example 30° to 60° C. At elevated temperature the tanning agent is taken up in the drum just as quickly as a water-soluble tanning agent. After tanning, a fat emulsified in water or a sulfonated or sulfated fat liquor is added, and indeed between 30 and 100% by weight, with reference to the tanning agent, depending on the kind of leather. If for the tanning there has been used a tanning agent which is poor in methylol groups, such as is obtained for example according to Examples 5 and 10, 10 to 15% by weight of formaldehyde, with reference to the tanning agent, may also be added with the fat. The absorption of fat can be accelerated by the addition of acid, as for example formic acid or acetic acid. With the tanning or, when preliminarily tanned hides are retanned with the tanning agents according to this invention, with the retanning there may also be combined the dyeing by adding to the tanning liquor a suitable dyestuff, as for example an azo dyestuff, and then fatting and acidifying in the usual way.

Retanning of chrome leather

Chrome tanned low-grade neat's and calf's hides are retanned in the vat with 3 to 10%, preferably 4 to 6%, by weight of one of the tanning agents prepared according to this invention at 30° to 60° C. in order to increase the body, avoid loose-grain character and to improve buffing. If desired dyeing can be effected in the same bath. It is then fat-liquored with 50 to 60% by weight of fat liquor, with reference to tanning agent, dried and finished off in the usual way. Chrome leather retanned in this way is also very well suited for the pasting process. In the case of the neat's leather which is often markedly injured in the grain, the grain is usually rubbed off. This takes place especially readily with the retanned leather.

Chrome suede and split suede leather

This is fulled and retanned with 1.5 to 3% by weight, with reference to the pared weight, of tanning agent prepared according to this invention, dyed in the same vat and if necessary subsequently fatted with 0.5 to 1% of fat. By the retanning, not only is the polish better but also the dyeing is faster to buffing and more brilliant after buffing. Clothing leather and clothing suede leather prepared by chrome tanning are not only deepened in color by retanning with 1 to 4% of tanning agent prepared according to this invention but also the stoppage of bleeding and the fastness to perspiration of the leather are increased.

Vegetable-tanned leather

In the case of vegetable-tanned leather the effect of the tanning agents according to this invention is a great increase in the fixation of the anionic tanning agents and the bleeding out of the water-soluble tanning agents is also reduced. Moreover the dyeing property of the leather is greatly improved. It is well known that leather prepared with synthetic anionic tanning agents dyes poorly. The fastness to light and the buffing property of the leather produced with the tanning agents prepared according to this invention are also increased. East Indian goat's leather, for example, after fulling in water or after slight detanning, is retanned with 2.5 to 5% by weight of a tanning agent prepared according to this invention, with reference to the pared weight, dried and buffed. It is then dyed and fatted in the usual way. An excellent full suede leather is obtained with a fine polish and level bright dyeing. In a similar way a full, very well and very fast dyed clothing grain leather and bookbinding leather are obtained. For example East Indian goat leather is retanned with 2 to 5% of a tanning agent prepared according to this invention and dyed at the same time. This simple method of operation can be used especially well because the tanning agent promotes extremely well the dyeing without faulty dyeings occurring.

Vegetable-tanned furniture and upholstery leather and also trunk leather are similarly improved in fastness properties and body by retanning with 3 to 6% of the tanning agents prepared according to this invention. The improvement in the dyeing property is of especially great importance for the leather dyed only with water-soluble dyestuffs.

When value is placed on softer leather by retanning, those tanning agents according to this invention are used which contain methylol urethanes or the etherified methylol compounds as methylol compounds. Softer leather can also be obtained by using tanning agents containing fat. The types of tanning agent just mentioned and the said combinations are however also suitable for the direct tanning of unhaired hides.

With the tanning agents prepared according to this invention the wearing properties of sole leather, the flexibility and the water-repelling action can be improved conssiderably. For example chrome sole leather is retanned with 5 to 10% of the tanning agents prepared according to this invention and fatted with the usual amount of fat, or unfilled vegetable sole leather is retanned with 5 to 12% of the tanning agents prepared according to this invention, the same amount of fat being used at the same time.

I claim:

1. A process for the production of tanning agents which comprises mixing together (I) one mol of a tanning salt of a complex-forming polyvalent metal, said salt being dispersible in water with an acid reaction and being selected from the group consisting of zinc, aluminum, titanium, zirconium, chromium and iron with (II) about ½ to 2 mols of an amine containing at least one hydrogen atom on one amino group, adding (III) a member of the class consisting of formaldehyde, paraformaldehyde, and polyglyoxal and condensing the product of (I), (II) and (III) in the presence of (IV) an aromatic hydroxy compound with (V) a condensation product of formaldehyde with a member of the class consisting of urea, melamine, dicyandiamide, ethylene-glycol-diurethane containing at least one hydrogen atom on one amino group and butane-diol-diurethane, in which process the amount by weight of (IV) is about ⅓ to 1½ that of (I)+(II) and the amount of (V) is about three times to ten times that of (I)+(II), calculated on the dry content of these substances.

2. A tanning agent comprising the product obtained by mixing together (I) one mol of a tanning salt of a complex-forming polyvalent metal, said salt being dispersible in water with an acid reaction and being selected from the group consisting of zinc, aluminum, titanium, zirconium, chromium and iron with (II) about ½ to 2 mols of an amine containing at least one hydrogen atom on one amino group, adding (III) a member of the class consisting of formaldehyde, paraformaldehyde, and polyglyoxal and condensing the product of (I), (II) and (III) in the presence of (IV) an aromatic hydroxy compound with (V) a condensation product of formaldehyde with a member of the class consisting of urea, melamine, dicyandiamide, ethylene-glycol-diurethane and butane-diol-diurethane containing at least one hydrogen atom on one amino group in which tanning agent the amount by weight of (IV) is about ⅓ to 1½ that of (I)+(II) and the amount of (V) is about three times to ten times that of (I)+(II), calculated on the dry content of these substances.

3. A tanning agent obtained by mixing (I) about 1 equivalent of an inorganic salt of a metal selected from the group consisting of zinc, aluminum, titanium, zirconium, chromium and iron with (II) 0.3 equivalent of a derivative of ammonia wherein 1 to 2 hydrogen atoms are substituted by a radical selected from the group consisting of aliphatic, cycloaliphatic, araliphatic and aromatic radicals with (III) a member of the class consisting of formaldehyde and paraformaldehyde and (IV) an aromatic hydroxy compound in the weight ratio of the dry content of (IV):(I)+(II) is equal to about 1:3 to 4.5:3, and grinding the whole with about 3 to 10 times, calculated on the weight of (I)+(II) with the formaldehyde-condensation product of a member of the class consisting of urea and melamine containing at least one hydrogen atom on one amino group.

4. A tanning agent as claimed in claim 3 wherein (I) is an aluminum salt, (II) is a mixture of cyclohexylamine and hexamethylene imine, (III) is paraformaldehyde, (IV) is resorcinol and wherein (V) contains a low amount of an alkali metal salt of naphthalene sulfonic acid condensed with formaldehyde.

5. A tanning agent as claimed in claim 4 comprising 15 parts by weight of cyclohexylamine, 5 parts by weight of hexamethylene imine, 66 parts by weight of $$Al_2(SO_4)_3 \cdot 18H_2O$$

18 parts by weight of resorcinol, 12 parts by weight of paraformaldehyde, 250 parts by weight of the reaction product of 1 mol of urea with 2 to 3.5 mols of formaldehyde and 30 parts by weight of an alkali metal salt of a naphthalene sulfonic-acid-formaldehyde-condensation product.

References Cited in the file of this patent

UNITED STATES PATENTS

| | | |
|---|---|---|
| 1,232,620 | Stiasny | July 10, 1917 |
| 2,316,740 | Dawson | Apr. 13, 1943 |
| 2,470,450 | Windus | May 17, 1949 |
| 2,763,649 | Albrecht et al. | Sept. 18, 1956 |
| 2,847,396 | Sellet | Aug. 12, 1958 |

FOREIGN PATENTS

| | | |
|---|---|---|
| 118,627 | Australia | June 14, 1944 |